Patented Aug. 25, 1953

2,650,213

UNITED STATES PATENT OFFICE 2,650,213

PRODUCTION OF POLYETHYLENE TEREPHTHALATE

Charles H. Hofrichter, Jr., Madison, Conn., assignor to E. I. du Pont de Nemours and Company, Wilmington, Del., a corporation of Delaware No Drawing. Application July 24, 1951, Serial No. 238,379

8 Claims. (Cl. 260—75)

This invention relates to an improved method for preparing a synthetic linear polyester which is essentially the condensation product of a dihydric alcohol and a dibasic acid, and more particularly to the preparation of polyethylene terephthalate, a film- and fiber-forming synthetic linear polyester.

The production of the novel class of film- and fiber-forming, linear polyesters of terephthalic acid and a glycol of the series $HO(CH_2)_nOH$ where "$n$" is an integer from 2 to 10 inclusive, is fully disclosed in U. S. P. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure and at elevated temperatures.

The above patent discloses numerous compounds which are suitable in varying degree as catalysts in the ester interchange reaction. Compounds disclosed include lithium, sodium, potassium, calcium, magnesium, zinc, cadmium, aluminum, manganese, iron, nickel and antimony. The alkali metals, the alkaline earth metals and magnesium are conveniently used in the form of alcoholates, or in the form of carbonates or borates. Magnesium may also be used in the form of its oxide. However, the catalytic activity of these materials falls off during the polymerization cycle and where catalysts of the polymerization reaction is desired, these catalytic materials are not satisfactory.

U. S. P. 2,534,028 to E. F. Izard describes and claims the use of litharge as both an ester interchange and a polymerization catalyst for bis-2-hydroxy-ethyl terephthalate monomer. In contrast with the catalysts disclosed by Whinfield and Dickson, litharge was found to be a good polymerization catalyst as well as a catalyst for the ester interchange reaction. As described in the patent to Izard, long polymerization cycles (necessary if no catalyst or a poor polymerization catalyst is used) favor the dimerization of ethylene glycol during the polymerization cycle with a resulting formation of a copolymer of ethylene glycol terephthalate with diethylene glycol terephthalate rather than the pure polyethylene terephthalate homopolymer. Since the presence of the diethylene glycol residue in the polymer chain adversely affects the properties of the resultant polymer when present in quantities larger than 2%–3%, it is highly desirable to employ a catalyst which eliminates dimerization of the glycol. Litharge, as described in the Izard patent, was found to accelerate polymerization to the extent that dimerization of the glycol was reduced to a substantial minimum. Polyethylene glycol terephthalate produced in the presence of catalytic amounts of litharge was found to have excellent physical properties for conversion into film or filaments.

However, when litharge is used in concentrations greater than 0.01%, based upon the weight of dimethyl terephthalate, the color of the resulting polymer is not acceptable for conversion to film or filaments. On the other hand, litharge concentrations of 0.01% or less, based on the weight of dimethyl terephthalate, do not speed up the polymerization reaction sufficiently for satisfactory commercial operation. Thus, a catalyst concentration of 0.01% or less produces a polymer having excellent color when the batch size is relatively small; that is, about 50–60 pounds or less. However, when the batch size is increased to commercial proportions, e. g., 1500–2000 pounds, the time required for complete polymerization also increases; and to prevent degradation of the color of the polymer resulting from exposure of portions of the reaction mass to polymerization conditions for extended periods of time, the rate of reaction must be increased proportionately, which would require the use of litharge in a concentration (above 0.01%) which would of itself impart undesirable color to the polymer.

An object of the present invention is to provide a catalyst system for accelerating and controlling the reaction between ethylene glycol and dimethyl terephthalate, and the subsequent polymerization of the resulting product. A further object is to provide a catalyst system for accelerating polymerization of comparatively large batches of monomer and, at the same time, prevent color degradation of the polymer. These and other objects will more clearly appear hereinafter.

The above objects are accomplished according to the present invention by carrying out the ester interchange between ethylene glycol and dimethyl terephthalate and subsequent polymerization of the resulting bis-2-hydroxy-ethyl terephthalate under super polyester-forming conditions in the presence of catalytic amounts of litharge (PbO), antimony trioxide and triphenyl phosphite. The present invention resides in the discovery that a catalyst system consisting of catalytic amounts of litharge, antimony trioxide and triphenyl phosphite is highly useful in the production of relatively large batches of bis-2-hydroxy-ethyl terephthalate and subsequent polymerization thereof. The present catalyst system permits the use of higher concentrations of litharge than could be normally tolerated when using litharge alone; and, as a result, the ester interchange and polymerization are accelerated. Furthermore, antimony trioxide serves to maintain a rapid rate of polymerization, especially during the latter stages of polymerization. The presence of triphenyl phosphite prevents color degradation during polymerization, and it is actually the presence of this compound which permits the use of higher concentrations of litharge and antimony trioxide than could be normally tolerated and still obtain good color.

The catalyst system of this invention comprises from 0.005%–0.1% of litharge, 0.01%–0.15% of antimony trioxide, and 0.01%–0.5% of triphenyl phosphite, based upon the weight of dimethyl terephthalate. Preferably, about 0.02%, 0.05% and 0.10% of litharge, antimony trioxide and triphenyl phosphite, respectively, are employed.

The following examples will serve to illustrate the practice of the present invention. Parts are by weight unless otherwise indicated.

*Example I*

A stainless steel batch still fitted with a stirrer and a cold water condenser was charged with 52 parts of dimethyl terephthalate (DMT) and 35 parts of ethylene glycol. The following compounds were also added to the still:

Litharge, 0.0104 part (0.02%, based on weight of of DMT)
Antimony trioxide, 0.026 part (0.05%, based on weight of DMT)
Triphenyl phosphite, 0.052 part (0.10%, based on weight of DMT)

The ester interchange reaction was carried out within a temperature range of 165–200° C. at atmospheric pressure. Methanol was continuously removed from the still, and the reaction was carried out for 3 hours, at which time all the methanol was removed from the reaction.

The resulting bis-2-hydroxy-ethyl terephthalate was transferred into a stainless steel autoclave fitted with a stainless steel double helical stirrer. The autoclave was heated to 275° C. and the pressure was gradually reduced over a period of 1 hour to about 5 mm. of Hg. The vacuum was applied through an ice trap and a Dry Ice trap. The pressure was finally reduced to about 0.5 mm.; and under this full vacuum, ethylene glycol was continuously removed from the polymerization reaction over a period of about 3 hours. The vacuum was then broken by introducing dry nitrogen into the autoclave, and the resulting product was forced out of the autoclave. The intrinsic viscosity of the polyethylene terephthalate was 0.75, and the color of the polymer was classified as color grade II. The color grade scale will be described hereinafter.

The intrinsic viscosity, denoted by the symbol $(\eta)_0$ is used herein as a measure of the degree of polymerization of the polyester and may be defined as $$\text{limit } \frac{\ln(\eta_r)}{C} \text{ as } C \text{ approaches } 0$$

wherein $\eta_r$ is the viscosity of a dilute phenol-tetrachloroethane (60–40) solution of the polyester divided by the viscosity of the phenol-tetrachloroethane mixture per se measured in the same units at the same temperature, and C is the concentration in grams of polyester per 100 cc. of solution.

The color grade is merely a comparative measure of the color of the resulting polymer as compared with samples of polymer used as color standards. The following is a description of the color standards:

I—Water-white
II—Very light amber
III—Light amber
IV—Amber
V—Dark amber

*Example II*

The following materials were introduced into a stainless steel batch still fitted with a stirrer and a condenser:

Dimethyl terephthalate (DMT), 2,020 pounds.
Ethylene glycol, 1,290 pounds.
Litharge (0.02%, based on the weight of DMT), 0.404 pound.
Antimony trioxide (0.05%, based on weight of DMT), 1.01 pounds.
Triphenyl phosphite (0.1%, based on weight of DMT), 2.02 pounds.

The Dowtherm jacket on the reaction vessel was maintained in the neighborhood of 265–286° C., and the temperature of the batch was within the range 175–225° C. From the time of evolution of methanol, the ester interchange reaction was carried out over a period of about 4¼ hours. Following the removal of methanol, the batch was heated to about 250° C. for about ¾ hour.

The resulting bis-2-hydroxy-ethyl terephthalate (containing a small amount of diethylene glycol terephthalate) was transferred to a 2,000-pound stainless steel autoclave having a Dowtherm jacket maintained at about 297° C. The autoclave was gradually evacuated by means of a vacuum pump connected through a water condenser. Under the full vacuum which was about 0.5 mm., polymerization was carried out over a period of about 11–11½ hours at a temperature of 255–275° C. Thereafter, nitrogen pressure was gradually applied and the resulting polymer was extruded from the autoclave. The color of the polymer was grade II, and intrinsic viscosity was 0.71. From the time of adding the raw materials to the extrusion of polymer from the autoclave, the overall cycle time was about 21½ hours.

This time includes the intermediate steps of charging, gradual heating, transfer to the autoclave, additional heating, application of vacuum, and extrusion of polymer from the autoclave.

*Example III*

The procedure described in Example I was repeated except that 0.0156 part of litharge (0.03% based upon the weight of dimethyl terephthalate) was added to the initial charge of reactants as the ester interchange and polymerization catalyst in place of the combination of litharge, antimony trioxide and triphenyl phosphite.

The ester interchange reaction extended over a period of 2⅓ hours, and the full vacuum polymerization cycle extended over a period of 4⅔ hours. This gave an overall reaction time of 7 hours as compared with 6 hours in Example I.

The intrinsic viscosity of the resulting polymer was 0.70 and the color was grade IV. This is in contrast to an intrinsic viscosity of 0.75 and a color grade of II for the polymer prepared in Example I.

It is to be understood that the foregoing examples are merely illustrative and that the present invention broadly comprises conducting an ester interchange and subsequent polymerization of the resulting bis-2-hydroxy-ethyl terephthalate under super polyester-forming conditions in the presence of catalytic amounts of litharge, antimony trioxide and triphenyl phosphite.

The initial condensation may be regarded essentially as a simple ester interchange and may be conveniently carried out at atmospheric pressure and at a temperature range between 140-220° C. and, preferably, between 150-200° C. The reaction may be also be carried out under pressures above and below atmospheric pressure, if desired.

Polymerization may be effected in either the liquid (i. e., melt) or solid phase. In the liquid phase, the reaction must be carried out at reduced pressure in the vicinity of 0.05-20 mm. of Hg with a range of 0.05-5.0 mm. Hg preferred for optimum results. This reduced pressure is necessary to remove free ethylene glycol which emerges from the polymer as a result of the condensation reaction, since the reaction mixture is very viscous. A temperature between 230-290° C. and, preferably, between 260-275° C. should be maintained during the polymerization step.

Depending upon the size of the batch, the ester interchange reaction usually takes place between 2-5 hours, batches in the neighborhood of 1500-2000 pounds taking about 4-5 hours.

The polymerization cycle is affected by a number of factors; namely, catalyst concentration, temperature, intrinsic viscosity desired and the size of the batch of polymer to be prepared. For commercial operation, it is highly desirable to have as short a polymerization cycle as possible, particularly to increase production and subject the polymer to elevated temperatures for a minimum time. Long polymerization cycles at elevated temperatures tend to initiate side reactions which degrade not only the color of the polymer but, also, the intrinsic viscosity.

The catalyst system of the present invention is particularly effective for polymerization of relatively large batches of monomer. Furthermore, the catalyst system is highly useful in accelerating ester interchange and polymerization when carried out continuously. By comparing the color grade of the polymers produced in Examples I and III, it is obvious that the color of the polymer prepared in the presence of litharge alone would generally not be acceptable for conversion into filaments and, particularly, for conversion into film. On the other hand, by using the catalyst system of the present invention, polymer of acceptable color for commercial use can be prepared in a shorter time than with litharge alone. Furthermore, Example II illustrates the preparation of a relatively large batch of polymer in which the polymerization under full vacuum was between 11-11½ hours. The use of litharge alone in such larger batches would be disadvantageous from two aspects; namely, the time required for polymerization and color of polymer. If a small amount of litharge were used to obtain optimum color, the polymerization cycle would be too long for commercial operation. On the other hand, higher concentrations of litharge would cause excessive color degradation.

The equipment generally used in carrying out the process of the present invention comprises an autoclave fitted with a helical or paddle stirrer large enough to scrape close to the sides of the vessel. In addition, the autoclave is fitted with a vacuum line connected through an ice trap and/or a Dry Ice trap. Assuming that the stirring action is vigorous, the amount of polymerizing liquid in the autoclave with respect to the actual capacity thereof tends to determine the efficiency of glycol removal and thereby affects the time required for polymerization. That is, if an autoclave is half full, agitation of the batch moves polymerizable liquid upward and onto the sides of the autoclave, thereby exposing a large surface to the effects of the vacuum. This action facilitates rapid removal of glycol from the polymerizing mass. On the other hand, agitation of a full batch generates less surface area, and a longer time for polymerization is required. In the commercial production of large batches of polymer, the autoclaves are usually filled to capacity and the surface area generation is relatively low. Hence, relatively longer polymerization cycles are required, and the employment of a catalyst system which promotes rapid polymerization without excessive color degradation is highly essential. And it is in such operation that the catalyst system of the present invention is highly useful.

The preferred amount of each component of the catalyst system of the present invention, based upon the weight of dimethyl terephthalate, is about 0.02% of litharge, 0.05% of antimony trioxide, and 0.10% of triphenyl phosphite. These are optimum concentrations for polymerization of relatively large batches, in the neighborhood of about 2,000 pounds, of bis-2-hydroxyethyl terephthalate. In general, the concentration of each component should be within the range of from 0.005-0.1% of litharge, 0.01-0.15% of antimony trioxide, and 0.01-0.5% of triphenyl phosphite. Litharge concentrations below the given range are ineffectual, and concentrations above about .01% produce polymer which is unacceptable for most uses insofar as color is concerned. Antimony trioxide functions mainly as a polymerization catalyst and serves to maintain a rapid polymerization rate over the entire polymerization cycle, particularly during the portion of the polymerization cycle when the intrinsic viscosity is increasing from 0.4 to the desired final viscosity between 0.55 and 1.2. Excess antimony trioxide, that is, above 0.15%, tends to precipitate. Triphenyl phosphite functions chiefly as an inhibitor of color degradation and, when used in excessive amounts, tends to inhibit polymerization. For large batch reactions, amounts less than about 0.05% do not effectively prevent color degradation; and it is recommended that at least 0.05% be employed. For less hold-up, as little as 0.01% is effective. Concentrations greater than about 0.5% appreciably inhibit polymerization and for large batch polymerization reactions, about 0.1% is preferred.

It is important that the triphenyl phosphite be added at the beginning of the polymerization reaction, which means that it can be added at any time before the intrinsic viscosity of the polymer reaches 0.1-0.2. From a practical standpoint, however, the present catalyst system consisting of the combination of three components is conveniently added at the beginning of the ester interchange reaction.

The ultimate use for the final polymer determines the desired intrinsic viscosity. For extrusion into film, the intrinsic viscosity should be in the range of 0.55 to 1.2. For extrusion into filaments, the intrinsic viscosity should be in the range of 0.3–1.2.

In film form, polyethylene terephthalate may be used in a large variety of applications; and, owing to the outstanding strength and toughness of the film, it can be used in calipers as low as 0.00025″. On the other hand, the films are transparent and of high clarity in calipers up to 0.005″–0.010″. Included among the general and many specific uses for polyethylene terephthalate film are the following: general wrapping and packaging of items such as rice, dried beans, sugar, coffee, fresh produce, soap powders, cement, automobile tires, textiles, greased and untreated machine parts, hardware, gift wrapping, etc.; packaging of articles to be sterilized, such as medicaments, instruments, chemicals, ointments, gauze, bandages and the like; packaging of foodstuff which may be heated in the package, such as hamburgers, frankfurters, popcorn, etc.; glass replacement for storm, greenhouse and chicken house windows; polarizing film for automobile headlights and windshields; windows for containers and envelopes; transparent cans; container and bottle cap liners; laminations with metal foil to give metallic effects in fabrics; laminations with wood, paper or fabrics for pictures, book covers, wall protectors for around light switches, etc.; wall paper in clear, pigmented or printed form; millinery applications, for example, in braid form either alone or laminated to another film of a different color; tare tapes for packages, i. e., cigarette packages; pressure sensitive tapes and adhesive tapes; various electrical applications such as slot insulation for motors, small coils in the form of metal laminations for telephone and radio equipment, primary insulation for heat resistant wire, pressure sensitive electrical tape, split mica insulating tape, i. e., mica sheets laminated between film, small condensers, i. e., metal foil laminated to film, weather resistant electrical wire, i. e., a conductor wrapped with film and coated with asphalt; and wrapping for submerged pipe to insulate against ground currents; sound recording discs, tapes and magnetic tapes; plastic binder for strengthening non-woven fabrics, parting sheets for low pressure laminating; fabric replacement for garment bags, shoulder covers, etc.; tubing for replacing metal tubing in various applications; protective devices such as face shields, goggles, etc.; base film for metallizing by sputtering or other techniques; bacteriostatic applications for inhibiting mold growth, mildew or bacteria growth; and various specific applications such as playing cards, greeting cards, milk bottle hoods, drinking straws, tying ribbon, tracing cloth, display and picnic dishes, disposable protectors against war gases, showcase covers, ground floors for tents, tent windows, printed charts, nomographs and scales, umbrellas, raincoats, file folders, refrigerator bags, tobacco pouches, snare and bass drum heads, tops for convertible automobiles, covers for automobiles in shipment and storage, display card holders, ticker tape, heat shrinkable bands, bottle caps, window shadows, etc.

As stated hereinabove, dimethyl terephthalate is the preferred ester monomer; and the present invention has been described with particular reference to this starting material. However, the catalyst system of this invention also effectively catalyzes the ester interchange between ethylene glycol and terephthalate esters of saturated aliphatic monohydric alcohols containing up to and including 4 carbon atoms, e. g., diethyl, dipropyl and diisobutyl terephthalates.

By using the catalyst system of this invention, large batches of polymer may be prepared using commercially feasible polymerizable cycles to obtain polymer of excellent color.

As many different embodiments may be made without departing from the scope and spirit of my invention, it is to be understood that the invention is in no way restricted save as set forth in the appended claims.

I claim:

1. In the process for producing filament- and film-forming polyethylene terephthalate wherein ethylene glycol is reacted under ester interchange conditions with an ester of terephthalic acid and a saturated aliphatic monohydric alcohol containing from 1 to 4 carbon atoms, and the resulting glycol terephthalate is polymerized, the improvement which comprises carrying out the polymerization reaction in the presence of a catalyst system consisting of from 0.005 to 0.1% by weight of litharge, from 0.01 to 0.15% by weight of antimony trioxide, and from 0.01 to 0.5% by weight of triphenyl phosphite, based on the weight of said ester of terephthalic acid.

2. The process of claim 1 wherein the catalyst system consists of about 0.02% by weight of litharge, about 0.05% by weight of antimony trioxide, and about 0.10% by weight of triphenyl phosphite, based on the weight of said ester of terephthalic acid.

3. In the process for producing filament- and film-forming polyethylene terephthalate wherein ethylene glycol is reacted under ester interchange conditions with dimethyl terephthalate, and the resulting glycol terephthalate is polymerized, the improvement which comprises carrying out the polymerization reaction in the presence of a catalyst system consisting of from 0.005 to 0.1% by weight of litharge, from 0.01 to 0.15% by weight of antimony trioxide, and from 0.01 to 0.5% by weight of triphenyl phosphite, based on the weight of the dimethyl terephthalate.

4. The process of claim 3 wherein the catalyst system consists of about 0.02% by weight of litharge, about 0.05% by weight of antimony trioxide, and about 0.10% by weight of triphenyl phosphite, based on the weight of the dimethyl terephthalate.

5. The process which comprises polymerizing bis-2-hydroxy-ethyl terephthalate at a temperature of from 230° to 290° C. under a pressure of from 0.05 to 20.0 millimeters of mercury in the presence of catalytic amounts of litharge, antimony trioxide, and triphenyl phosphite.

6. A process for producing filament- and film-forming polyethylene terephthalate which comprises reacting ethylene glycol and dimethyl terephthalate in the presence of catalytic amounts of litharge, antimony trioxide, and triphenyl phosphite at a temperature of from 140° to 220° C. until no further methanol is liberated, and thereafter continuing reaction in the presence of said litharge, antimony trioxide, and triphenyl phosphite at a temperature of from 230° to 290° C. and at a pressure of from 0.05 to 20.0 millimeters of mercury, until a fiber-forming linear polyester having an intrinsic viscosity of at least 0.3 is formed.

7. The process of claim 6 wherein from 0.005 to 0.1% by weight of litharge, from 0.01 to 0.15% by weight of antimony trioxide, and from 0.01 to 0.5% by weight of triphenyl phosphite, based on the weight of dimethyl terephthalate, is used.

8. The process of claim 6 wherein about 0.02% by weight of litharge, about 0.05% by weight of antimony trioxide, and about 0.10% by weight of triphenyl phosphite, based on the weight of dimethyl terephthalate, is used.

CHARLES H. HOFRICHTER, JR.

References Cited in the file of this patent

UNITED STATES PATENTS

| Number | Name | Date |
|---|---|---|
| 2,437,046 | Rothrock et al. | Mar. 2, 1948 |

Certificate of Correction

Patent No. 2,650,213                                                        August 25, 1953

CHARLES H. HOFRICHTER, JR.

It is hereby certified that error appears in the printed specification of the above numbered patent requiring correction as follows:

Column 1, line 35, for "catalysts" read *catalysis*; column 6, line 48, for ".01%" read *0.1%*; column 8, line 11, for "polymerizable" read *polymerization*; and that the said Letters Patent should be read as corrected above, so that the same may conform to the record of the case in the Patent Office.

Signed and sealed this 6th day of October, A. D. 1953.

[SEAL]

ARTHUR W. CROCKER,
*Assistant Commissioner of Patents.*